US009452701B1

(12) United States Patent
Allen

(10) Patent No.: US 9,452,701 B1
(45) Date of Patent: Sep. 27, 2016

(54) LOCKING CUP HOLDER FOR A MARINE VESSEL

(71) Applicant: Research & Design Innovations, LLC, Branford, CT (US)

(72) Inventor: Donald Terry Allen, Madison, CT (US)

(73) Assignee: RESEARCH & DESIGN INNOVATIONS, LLC, Branford, CT (US)

( * ) Notice: Subject to any disclaimer, the term of this patent is extended or adjusted under 35 U.S.C. 154(b) by 0 days.

(21) Appl. No.: 14/841,131

(22) Filed: Aug. 31, 2015

Related U.S. Application Data

(60) Provisional application No. 62/173,595, filed on Jun. 10, 2015, provisional application No. 62/150,577, filed on Apr. 21, 2015.

(51) Int. Cl.
| | |
|---|---|
| *B63B 17/00* | (2006.01) |
| *A47K 1/08* | (2006.01) |
| *B60N 3/10* | (2006.01) |

(52) U.S. Cl.
CPC .................. *B60N 3/103* (2013.01); *A47K 1/08* (2013.01); *B63B 17/00* (2013.01)

(58) Field of Classification Search
CPC ........ A47K 1/08; A47G 23/02; B63B 17/00; B63B 25/002; B63B 29/06; B63B 45/04
USPC .............................. 114/343, 364; 248/311.2
See application file for complete search history.

(56) References Cited

U.S. PATENT DOCUMENTS

| | | | | |
|---|---|---|---|---|
| 7,500,443 | B1* | 3/2009 | Allen ...................... | B63B 29/06 114/343 |
| 2004/0084592 | A1* | 5/2004 | Engel ..................... | B60N 3/106 248/311.2 |
| 2008/0314310 | A1* | 12/2008 | Little ..................... | B63B 25/002 114/364 |

* cited by examiner

*Primary Examiner* — Lars A Olson
(74) *Attorney, Agent, or Firm* — DeLio, Peterson & Curcio, LLC; Peter W. Peterson

(57) ABSTRACT

A locking cup holder for mounting in a deck surface having a deck opening. The locking cup holder comprises a mounting ring having a vertical lip with a lower edge for extending within the deck opening and a horizontal lip securable to the deck surface over the deck opening. The locking cup holder includes a cup holder having a wall, a bottom portion, a rim extending outwardly from an upper portion of the wall and a plurality of protrusions extending outwardly from the cylindrical wall below the rim, the cup holder protrusions being spaced from the cup holder rim a distance of at least the height of the mounting ring vertical lip, the protrusions engagable with the vertical lip when the cup holder is pushed fully into the mounting ring. The protrusions may be engagable with the lower edge of the vertical lip when the cup holder is pushed fully into the mounting ring.

20 Claims, 8 Drawing Sheets

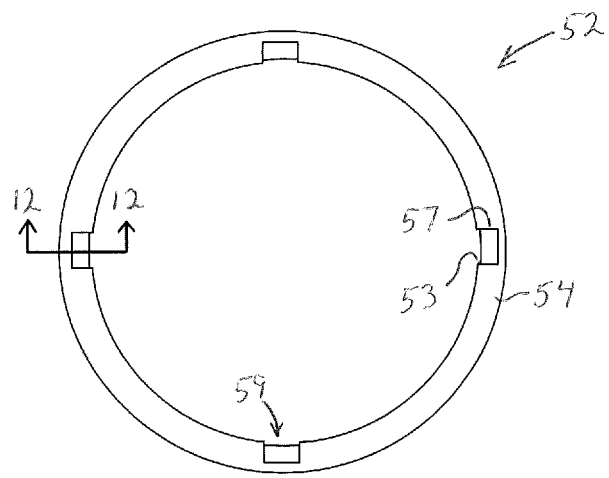
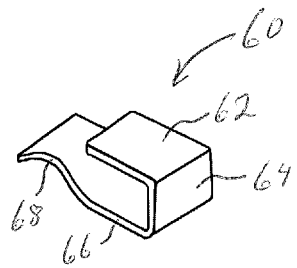
FIG. 8
FIG. 10
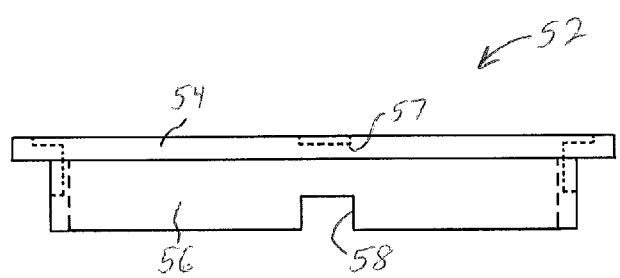
FIG. 9
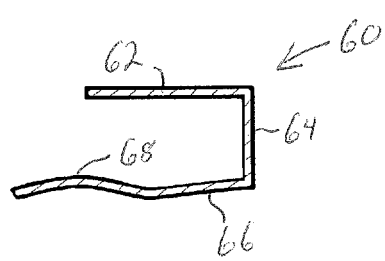
FIG. 11
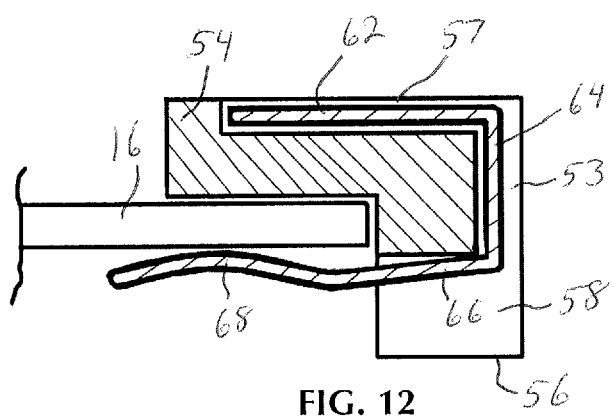
FIG. 12

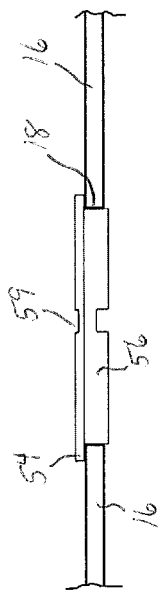
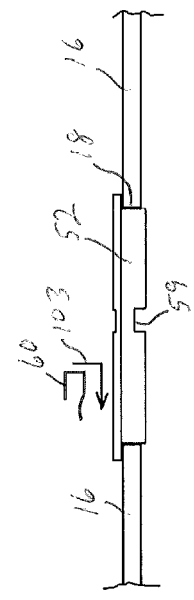
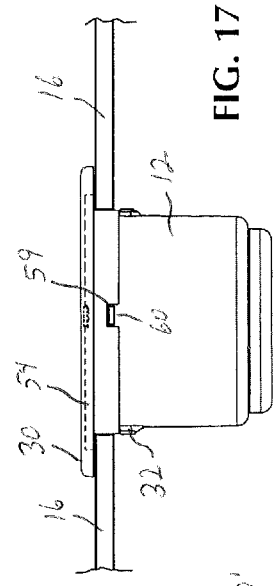
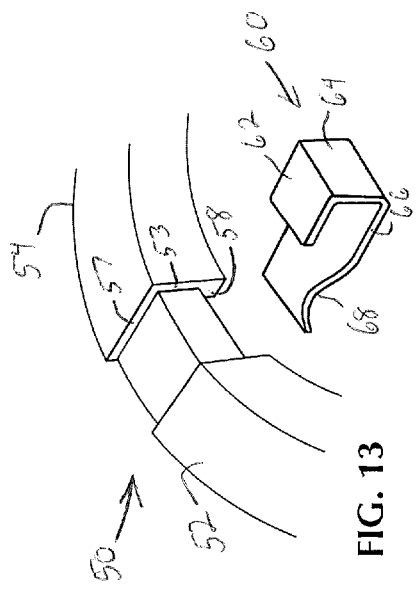
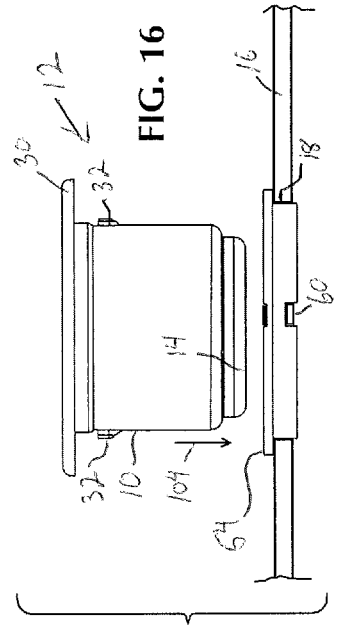
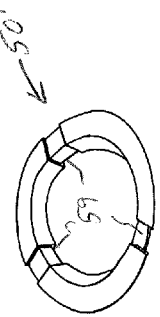

US 9,452,701 B1

LOCKING CUP HOLDER FOR A MARINE VESSEL

BACKGROUND OF THE INVENTION

1. Field of the Invention

The present invention relates to cup holders for mounting in the deck on a marine vehicle and more specifically for cup holders which are removably secured to the deck of a vessel.

2. Description of Related Art

Cup holders are installed in openings of marine vessels so that a vessel occupant can place a cup, can, beverage container and the like therein. The cup holders are installed with a press fit or adhesive. The problem with a press fit is that the cup holder may loosen with time, especially given the thrashing that a marine vessel takes while in the water. Cup holders that are fastened into place with adhesives are difficult to remove without damaging the vessel deck or the cup holder. There is a need for a cup holder which may be installed in the deck of a vessel that will stay properly mounted until the mounting cup is purposely removed from the deck, without damaging the deck or the cup holder. Additionally, the cup holder should be easily installed so that a technician installing the cup holder will not spend excessive time performing the installation.

SUMMARY OF THE INVENTION

Bearing in mind the problems and deficiencies of the prior art, it is therefore an object of the present invention to provide a cup holder for a marine vessel which will neatly affix within an opening in the vessel deck.

It is another object of the present invention to provide a cup holder which can be installed in the deck of a vessel without motion of the vessel causing the cup holder to loosen in the deck opening.

A further object of the invention is to provide a cup holder which may be installed in a deck of a marine vessel and be later removed without damaging the vessel deck or the cup holder.

It is yet another object of the present invention to provide a cup holder for a marine vessel which may be quickly installed and easily uninstalled without damaging the vessel or cup holder.

Still other objects and advantages of the invention will in part be obvious and will in part be apparent from the specification.

The above and other objects, which will be apparent to those skilled in the art, are achieved in the present invention which is directed to a locking cup holder for mounting in a deck surface having a deck opening. The locking cup holder comprises a cup holder having a side wall and a bottom portion along a lower end of the side wall, a base plate having an opening securable to the lower end of a cup holder and a plurality of springs attached to the base plate to allow rotation of the springs about the base plate. The springs are rotated outwardly from the side wall prior to inserting the locking cup holder into the deck opening and upon insertion of the cup holder into the deck opening, the springs rotate against an underside of the deck and lock the cup holder into the opening. The locking cup holder may include a protrusion extending downwardly from the bottom portion of the cup holder and an opening in the base plate wherein the protrusion is engagable with the base plate opening. The protrusion may include threads and the base plate may be secured to the bottom plate by engaging the opening with the protrusion and securing a threaded fastener to the threaded protrusion. The protrusion may include a channel extending therethrough. The springs may be biased to rotate upwardly toward the side walls of the cup holder. The springs may be elongated and may include a first end rotatably connected to a pivot pin secured to the base plate and a distal end which rotates in an arc about the pivot pin. The spring first end may be a coil wrapped about the pivot pin and secured at a coil first end to the base plate for providing the rotational tension of the spring.

Another object of the present invention is directed to a method of mounting and locking a cup holder in a deck surface having a deck opening. The method comprises providing a cup holder having a side wall and a bottom portion along a lower end of the side wall, a base plate having an opening securable to the lower end of a cup holder, and a plurality of springs attached to the base plate to allow rotation of the springs about the base plate. The method includes rotating the springs outwardly from the side wall, inserting the cup holder into the deck opening and rotating the springs against an underside of the deck and locking the cup holder into the opening.

Another object of the present invention is directed to a locking cup holder for mounting in a deck surface having a deck opening. The locking cup holder comprises a mounting ring having a vertical lip for extending within the deck opening and a horizontal lip extending outward from the vertical lip over the deck surface about the deck opening. The locking cup holder includes a plurality of grooves in the horizontal lip of the mounting ring, a plurality of clips, each clip having a first horizontal portion engagable in the horizontal lip groove and a second horizontal portion below the first horizontal portion and a cup holder securable within the mounting ring. The clips secure the mounting ring to the deck surface about the deck opening when the clip first horizontal portion engages one of the grooves in the horizontal lip and the clip second horizontal portion engages the deck surface about the deck opening. The locking cup holder may include a plurality of grooves in the vertical lip engagable with the clip bottom portion. The locking cup holder may include a plurality of protrusions extending outwardly from the side wall. The cup holder may include a horizontal lip engagable with the mounting ring horizontal lip. Each clip may have a vertical portion extending downward from the first horizontal portion and second horizontal portion extends outwardly from a lower end of the vertical portion. The clip second horizontal portion may be engagable with a lower side of the deck surface. The clip may be locked into a securing position when the cup holder assembly is in the inserted position.

Another object of the present invention is directed to a method of mounting a cup holder in a deck surface having a deck opening. The method includes providing a mounting ring having a vertical lip for extending within the deck opening and a horizontal lip extending outward from the vertical lip over the deck surface about the deck opening, the mounting ring having a plurality of grooves in the horizontal lip. The method includes providing a plurality of clips, each clip having a first horizontal portion engagable in the horizontal lip groove and a second horizontal portion below the first horizontal portion. The method includes providing a cup holder securable within the mounting ring and placing the mounting ring in the deck opening with the vertical lip extending within the deck opening and the horizontal lip extending outward from the vertical lip over the deck surface about the deck opening. The method includes placing the clips in the mounting ring grooves such that the clip first horizontal portion engages one of the grooves in the horizontal lip and the clip second horizontal portion engages the deck surface about the deck opening to secure the mounting ring to the deck surface and placing and securing the cup holder within the mounting ring.

Another object of the present invention is directed to a locking cup holder for mounting in a deck surface having a deck opening. The locking cup holder comprises a mounting ring having a vertical lip with a lower edge for extending within the deck opening and a horizontal lip securable to the deck surface over the deck opening. The locking cup holder includes a cup holder having a wall, a bottom portion, a rim extending outwardly from an upper portion of the wall and a plurality of protrusions extending outwardly from the cylindrical wall below the rim, the cup holder protrusions being spaced from the cup holder rim a distance of at least the height of the mounting ring vertical lip, the protrusions engagable with the vertical lip when the cup holder is pushed fully into the mounting ring. The locking tab may extend through the sidewall of the cup holder and may be removable from the interior of the cup holder. The protrusions may be engagable with the lower edge of the vertical lip when the cup holder is pushed fully into the mounting ring.

Another object of the present invention is directed to a method of mounting a locking cup holder in a deck surface having a deck opening. The method comprises providing a mounting ring having a vertical lip with a lower edge for extending within the deck opening and a horizontal lip securable to the deck surface over the deck opening. The method includes providing a cup holder having a wall, a bottom portion, a rim extending outwardly from an upper portion of the wall and a plurality of protrusions extending outwardly from the cylindrical wall below the rim, the cup holder protrusions being spaced from the cup holder rim a distance of at least the height of the mounting ring vertical lip. The method includes placing the cup holder within the mounting ring and securing the cup holder in the mounting ring by engaging the protrusions with the vertical lip when the cup holder is pushed fully into the mounting ring.

BRIEF DESCRIPTION OF THE DRAWINGS

The features of the invention believed to be novel and the elements characteristic of the invention are set forth with particularity in the appended claims. The figures are for illustration purposes only and are not drawn to scale.

FIG. 8 is a top plan view of another embodiment of the cup holder mounting ring according to the present invention.

FIG. 9 is a side elevational view of the cup holder mounting ring shown in FIG. 8.

FIG. 10 is a perspective view of a clip for mounting the mounting ring shown in FIG. 9.

FIG. 11 is a side elevational view of the clip shown in FIG. 10.

FIG. 12 is a perspective view of a portion of the mounting ring shown along cut lines 12-12 in FIG. 8.

FIG. 13 is a cross sectional view of a mounting ring assembly having the mounting ring of FIG. 8, clip and a portion of the deck.

FIG. 14 is a side elevational view showing one step in a method for installing the mounting ring and clip of FIGS. 8 and 9.

FIG. 15 is a side elevational view showing another step in the method for installing the mounting ring and clip of FIGS. 8 and 9.

FIG. 16 is a side elevational view showing yet another step in the method for installing the mounting ring and clip of FIGS. 8 and 9.

FIG. 17 is a side elevational view showing the secured cup holder assembly in the method for installing the mounting ring and clip of FIGS. 8 and 9.

FIG. 18 is a perspective view of another embodiment of the mounting ring shown in FIG. 8.

DESCRIPTION OF THE EMBODIMENT(S)

In describing the embodiment(s) of the present invention, reference will be made herein to FIGS. 1-27 of the drawings in which like numerals refer to like features of the invention.

Figure 1:
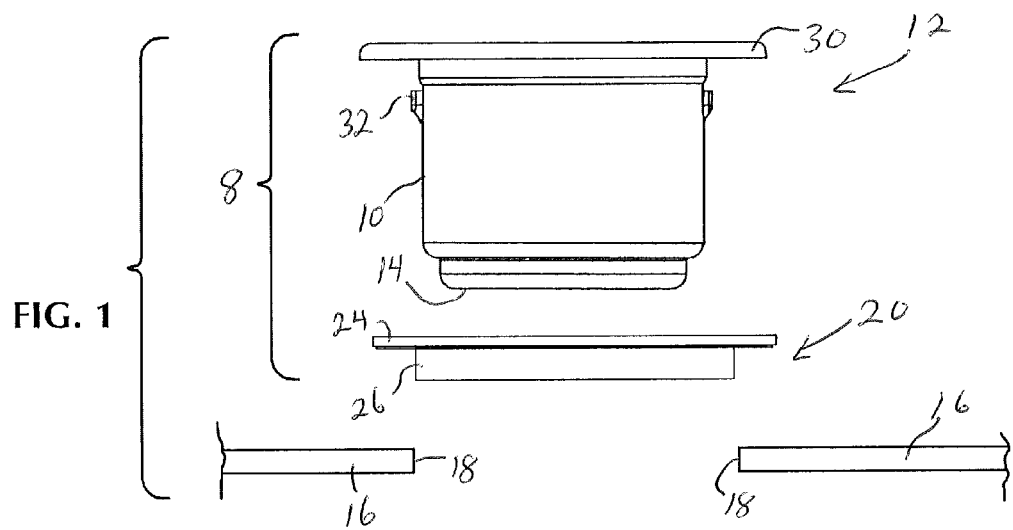
FIG. 1 is a side exploded view of the cup holder assembly and deck opening according to the present invention.
Figure 2:
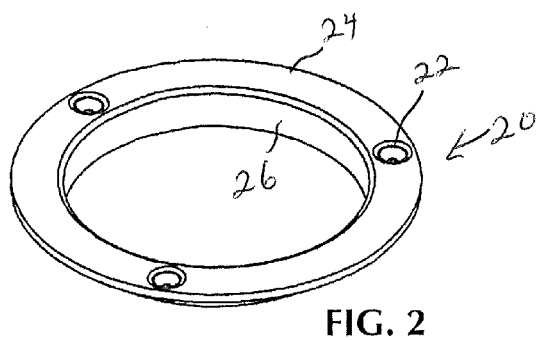
FIG. 2 is a perspective view of the mounting ring according to the present invention.
Figure 3:
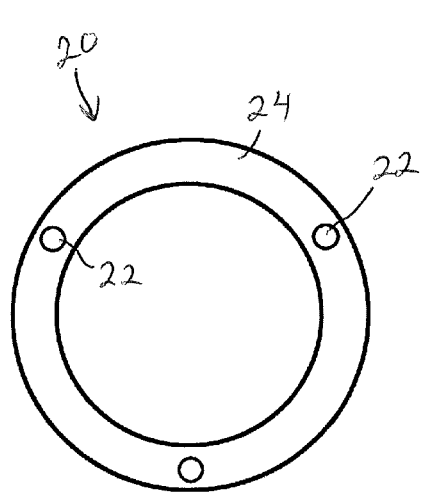
FIG. 3 is a top view of the mounting ring shown in FIG. 2.
Figure 4:
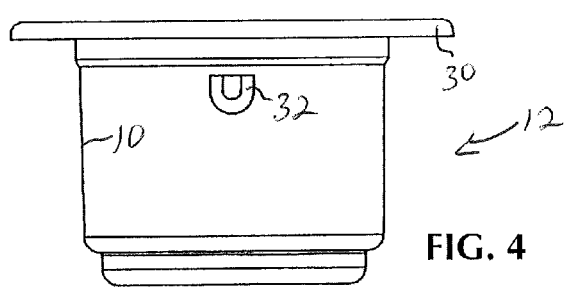
FIG. 4 is a side elevational view of the cup holder shown in FIG. 1.
Figure 5:
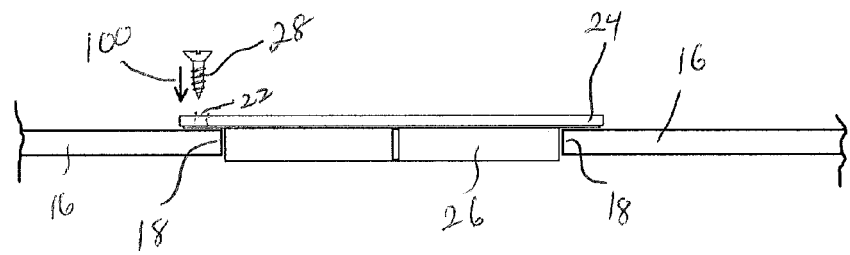
FIG. 5 is a side elevational view of showing the method for installing the cup holder according to the present invention.

One embodiment of the locking cup or beverage holder shown in FIGS. 1-4 is a cup holder assembly 8 for mounting in a vessel deck surface 16 within a deck opening 18 of the deck surface 16. The cup holder assembly 8 includes a mounting ring 20 having a vertical lip 26 for mounting within the deck opening 18 and a horizontal lip or mounting ring flange 24 integral with the vertical wall 26. The mounting ring is securable to the deck surface 16 when the vertical lip 26 is disposed within the deck opening 18. The cup holder assembly 8 includes a cup holder 12 having a cup holder sidewall 10 and a bottom plate 14 formed as a unitary piece along a bottom portion of the side wall 10. The cup holder 12 includes a rim or cup holder flange 30 extending outwardly from an upper portion of the side wall 10 and a plurality of locking tabs 32 extending outwardly from the sidewall 10 below the cup holder flange 30 a distance sufficient for the locking tabs 32 to slide below the mounting ring vertical lip 26 when the cup holder 12 is urged downwardly through the mounting ring 20 until the mounting ring flange 24 is resting against the upper portion of the deck surface 16. The locking tabs 32 are engagable with the lower edge of the vertical lip 26 when the cup holder 12 is pushed fully into the mounting ring 20. The locking tabs 32 may extend through the sidewall 10 of the cup holder 12 and may be removable from the interior of the cup holder 12. The mounting ring flange 24 may be secured to upper side of the deck surface 16 with an adhesive or a tape having adhesive on one or both sides of the tape or, the mounting ring 20 may be fastened to the deck surface 16 with at least one fastener 28 extending through a mounting ring aperture 22 as shown in FIG. 5. The mounting ring vertical lip is sufficiently flexible to allow the locking tab 32 to slide against and past the mounting ring vertical lip when the cup holder 12 is urged downward into the mounting ring 20.

Figure 6:
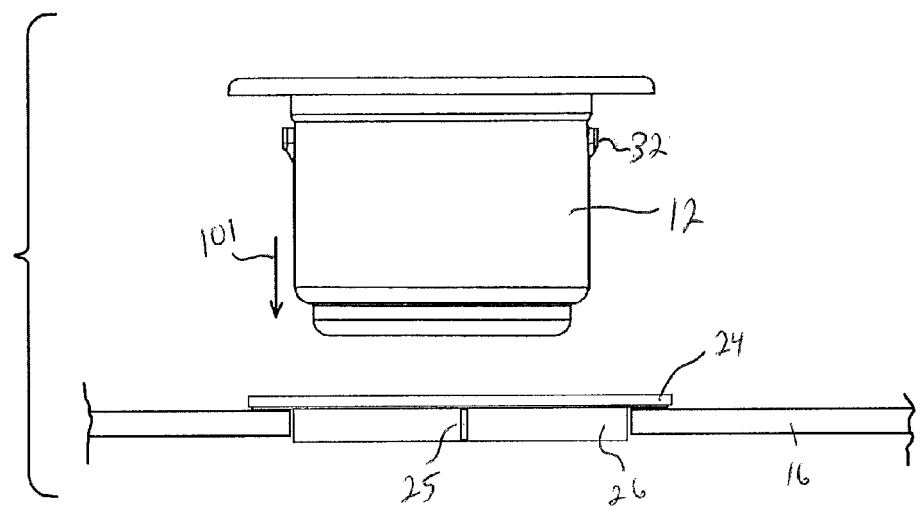
FIG. 6 is a side elevational view of showing another step in the method for installing the cup holder according to the present invention.
Figure 7:
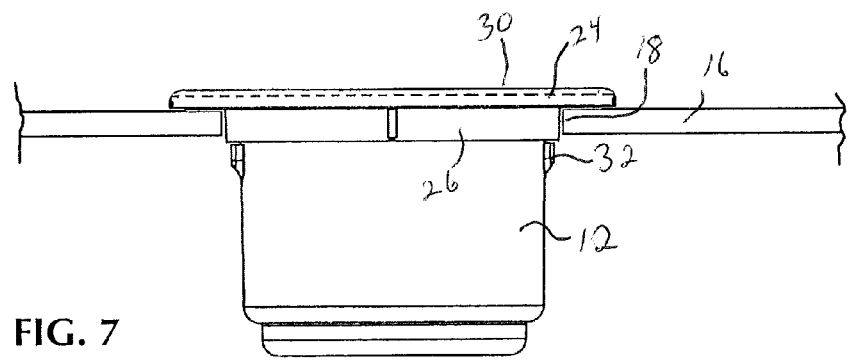
FIG. 7 is a side elevational view of showing yet another step in the method for installing the cup holder according to the present invention.

In a method for using the cup holder assembly as shown in FIGS. 5-7, an installer places the mounting ring 20 within the deck opening 18 with the mounting ring flange 24 resting against the upper portion of the deck surface 16 and engages the fastener 28 through the mounting ring aperture 22 and into the deck surface 16 in the direction as shown by arrow 100. The installer may drill a hole into the deck surface 16 to prevent damage to the deck surface 16 when securing the fastener 28 to the deck surface 16. The installer then urges the cup holder 12 downwardly in the direction of arrow 101, through the mounting ring 20, until the locking tabs 32 slide past the mounting ring vertical lip 26 until the locking tabs 32 lock into place. The cup holder flange 30 may be hollow as shown in the installed cup holder assembly 8 of FIG. 7 so that the mounting ring flange 24 is visually hidden by the cup holder flange 30 when the cup holder assembly 8 is in the installed position.

Figure 26:
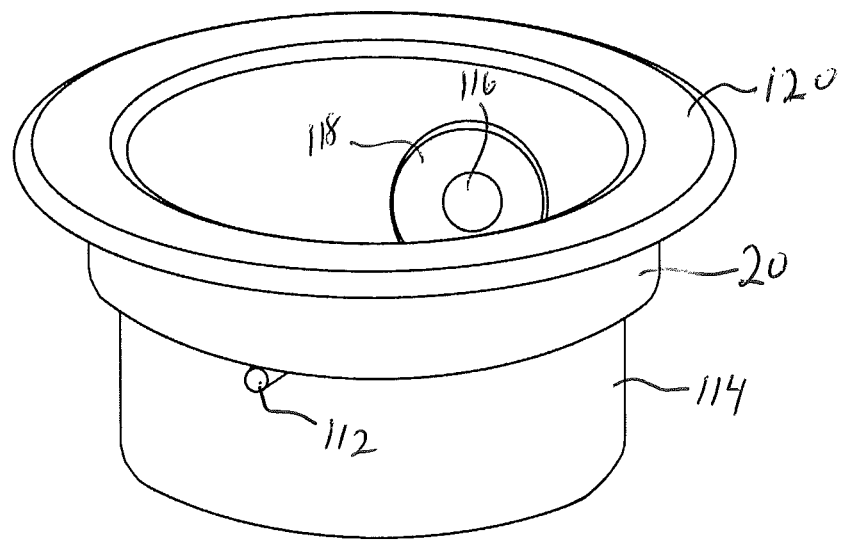
FIG. 26 is a perspective view of an alternate mounting ring assembly having a removable protrusion.
Figure 27:
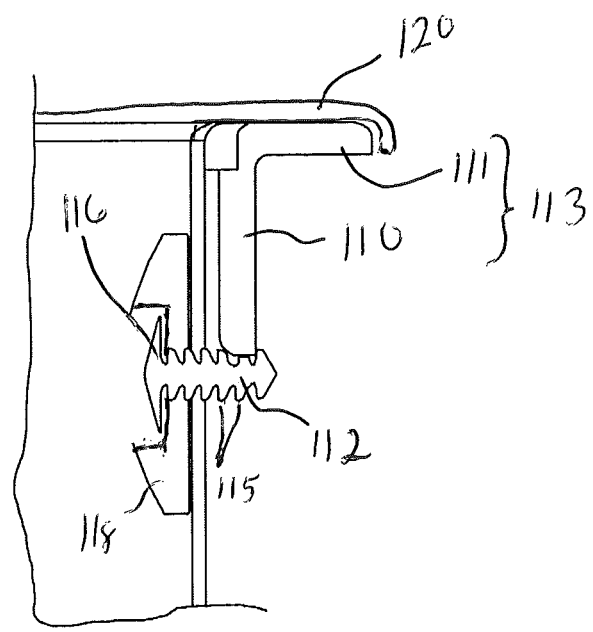
FIG. 27 is a side cutaway view of the mounting ring assembly shown in FIG. 25.

As shown in FIGS. 26 and 27, an alternate cup holder 120 may include projections 112 for locking under the mounting ring 20 rather than the locking tabs 32. The projections 112 are removably secured to the side wall of cup holder 114. The projections 112 may include a head portion 116, resilient fingers for maintaining a friction fit in the sidewall of the cup holder 114 and a washer 118 adjacent the head portion 116.

Another embodiment of a mounting ring assembly 50 is shown in FIGS. 8-17, a portion of the mounting ring assembly 50 shown in the perspective view of FIG. 13. The locking cup holder assembly 12 may be mounted in a deck surface 16 having a deck opening 18. The mounting ring assembly 50 includes a mounting ring 52, a plurality of locking clips 60 and a plurality of clip grooves 59 in the mounting ring 52 for engaging the locking clip 60. The mounting ring 52 has a horizontal flange 54 extending outwardly from a vertical lip 56, the vertical lip 56 disposed within the deck opening 18 when the mounting ring 52 is in the installed position. The horizontal flange 54 is securable over the deck surface 16. The clip grooves 59 on the mounting ring 52 include an upper groove portion 57 disposed in the horizontal flange 54. The clip grooves 59 include an inside groove portion 53 and a bottom groove portion 58 disposed on the vertical lip 56, adjacent the upper groove portion. The locking clips 60 have an upper horizontal clip portion 62 engagable in the mounting ring upper groove portion 57, a vertical clip portion 64 extending downward from the upper horizontal clip portion 62 and engagable in the inside groove portion 53. The locking clip 60 includes a bottom horizontal clip portion 66 extending inwardly from vertical clip portion 64 and the inside groove portion 53 which is engagable with the bottom groove portion 58 of the mounting ring 52. A curved clip portion 68 is a further extension of the bottom horizontal clip portion 66. The upper groove portion 57 on mounting ring 52 may extend fully across the horizontal flange 54 as shown in FIGS. 13-18 or extend partially across the horizontal flange 54 as shown in FIGS. 9-12. FIGS. 11 and 12 show the locking clip 60 in the tensioned position so that when the mounting ring assembly 50 is in the installed position, the curved clip portion 68 is urged upward against the lower side of the deck surface 16 and the upper horizontal clip portion 62 is urged downward against the upper side of the deck surface 16, maintaining the mounting ring in the deck opening 16. The cup holder side wall 10 maintains the locking clips 60 in the clip groove 59. The locking cup holder may include a plurality of locking tabs 32 extending outwardly from the side wall. The cup holder horizontal flange 30 is engagable with the mounting ring horizontal flange 54 so the mounting ring horizontal flange 54 is visually hidden beneath the cup holder horizontal flange 30 when the cup holder assembly 12 is in the installed position.

The locking cup holder assembly includes the locking mounting ring assembly 50 and cup holder 12. The cup holder 12 locks the clip 60 into the mounting ring groove 59 which in turn locks the mounting ring 52 into a deck opening 18 without the use of screws, bolts or fasteners which penetrate the deck surface 16. The retaining clip 60 slides over the mounting ring recessed area or groove 59.

The locking clips 60 may be made of spring steel, plastic or other material which may provide flexibility with bias back to an un-deformed state. The bottom clip portion 66 may be longer than the upper clip portion 62. The curved clip portion 68 is a further extension of the bottom clip portion 66 and allows the installer to easily engage the mounting ring 52 and deck surface 16 when installing the mounting ring 52. Using the curved clip portion 68 it is easy to force the locking clip 60 on thicker decks while still having the ability to maintain the mounting ring 52 on thinner decks. The clip curved portion 68 is a cantilever structure that flexes up and down to accommodate different thickness decks. As shown in FIG. 12, the curved clip portion 68 is flexed downward and forces the deck surface 16 upward against the mounting ring 52. The locking clip 60 flexibility and strength give it the ability to secure in varying conditions and requirements.

The shape of the clip's vertical clip portion 56 is consistent with the radius of the cup holder 12 and locks the locking clip 60 in the engaged position when the cup holder 12 is pushed into the mounting ring 52 central opening. The side wall 10 of the cup holder 12 locks the clip in place when the cup holder 12 is in the installed position. As shown in FIG. 17, the cup holder 12 is retained in its installed position by a locking tab 32 which passes the mounting ring vertical wall 56. When the locking tab 32 is under the mounting ring vertical wall 56, the locking tab 32 and cup holder 12 are locked into the installed position.

In a method for installing the locking cup holder shown in FIGS. 14-17, an installer places the mounting ring 52 within the deck opening 18 until the mounting ring horizontal flange 54 rests against the upper side of the deck surface 16. The locking clips 60 are engaged with the mounting ring grooves 59 as shown by direction arrow 103 in FIG. 15, with the curved clip portion 68 resting against the lower side of the deck surface 16, the upper clip portion 62 fully engaged with the upper groove portion 57 and the vertical clip potion 64 engaged with the vertical groove portion 53. The cup holder 12 is then placed above the deck opening 18 and moved downward in the direction of arrow 104 until the cup holder flange 30 rests against the upper side of the deck surface 16, fully covering the mounting ring horizontal flange 54 as shown in FIG. 17.

The mounting ring may alternately have more or less grooves 59 than the embodiment of FIGS. 8-17, such as the three grooves 59 shown in the mounting ring 50' of FIG. 18.

Figure 19:
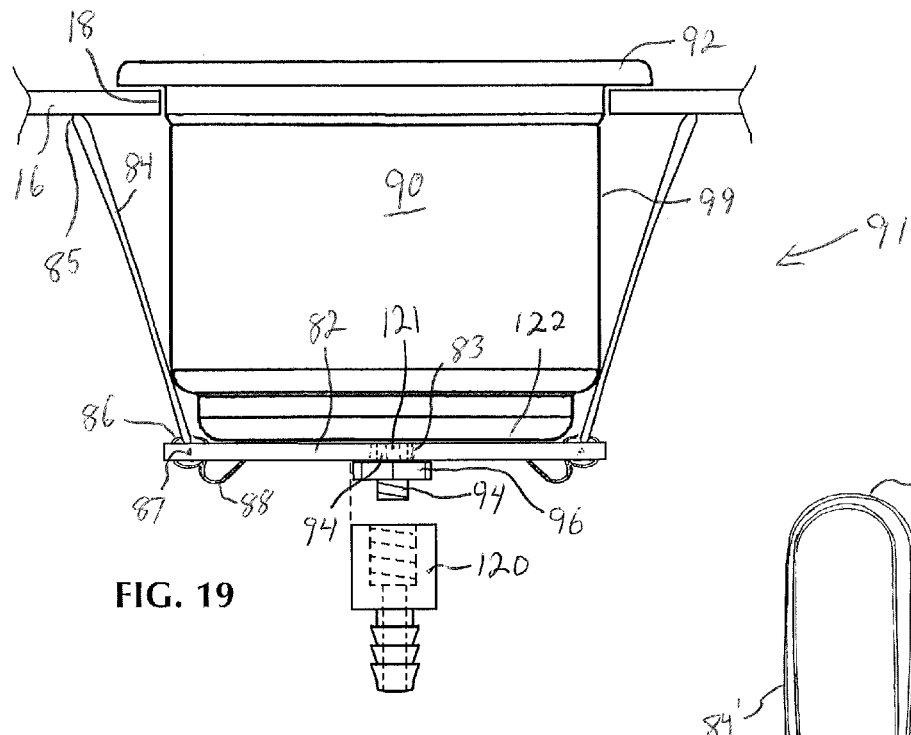
FIG. 19 is a side elevational view of another embodiment of the cup holder assembly having a base plate and pair of mounting springs according to the present invention.
Figure 21:
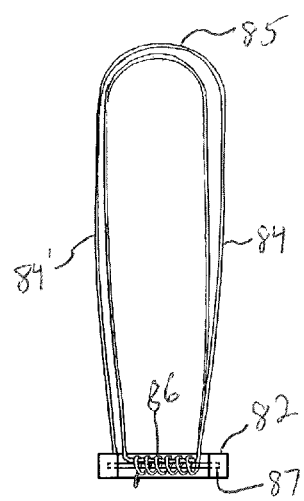
FIG. 21 is a front elevational view of the mounting plate and springs shown in FIG. 20.
Figure 20:
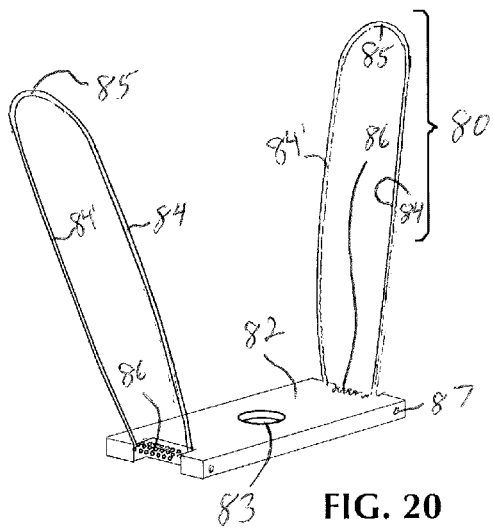
FIG. 20 is a perspective view of the mounting plate and springs shown in FIG. 19.
Figure 21A:
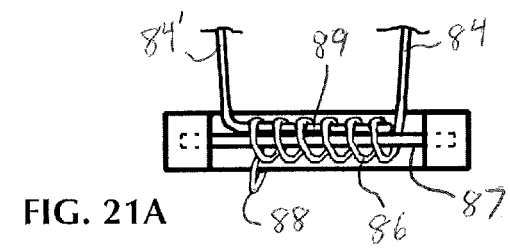
FIG. 21A is an enlarged front elevational view of the mounting plate and spring lower portion shown in FIG. 21.
Figure 22:
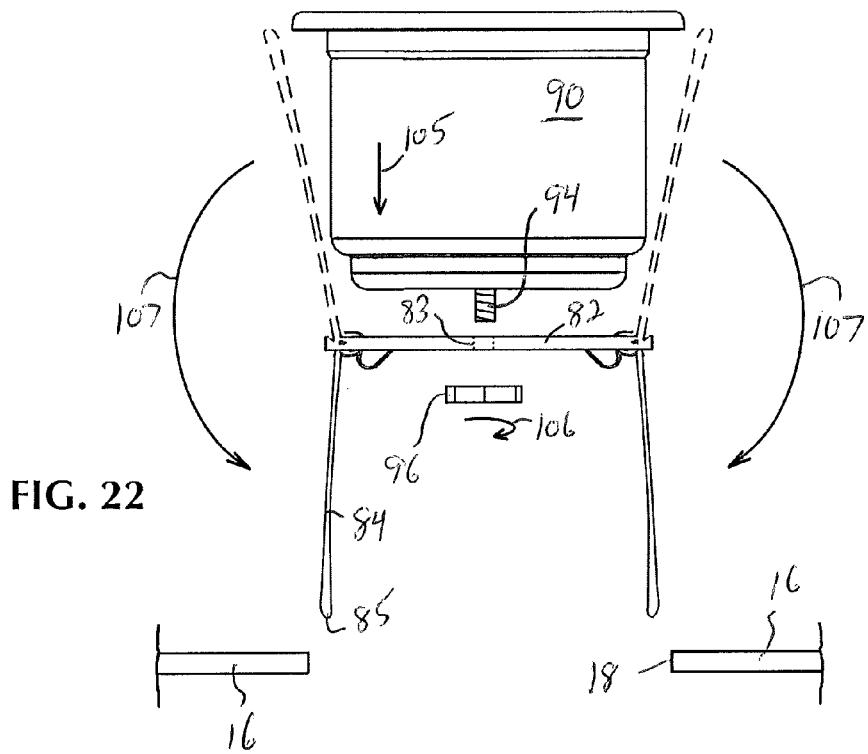
FIG. 22 is a side elevational view showing one step in the method for installing the cup holder assembly shown in FIG. 19.

In another embodiment as shown in FIGS. 19-21A and further shown in its method of installing in FIGS. 22-25, the locking cup holder assembly 91 includes cup holder 90, base plate 82 and spring assembly 80 attached rotatingly to the base plate 82 with pin 87, pin 87 extending through a portion of the base plate 82. The cup holder 90 includes side walls 99, bottom plate 94 and a lower protrusion 94 extending downward from the bottom plate 122. The cup holder includes a flange 92 extending outwardly from an upper rim of the sidewalls 99. The lower protrusion 94 may be threaded and engagable with a threaded fastener 96. The lower protrusion 94 may also engage a drain adapter 120 as shown in FIG. 19 which may be used to drain the cup holder 90 though a flexible tube attachable to the drain adapter 120. The protrusion 94 may have a protrusion channel 121 for draining the cup holder 90. The base plate 82 includes a base plate opening 83 which is engagable with the cup holder lower protrusion 94. The base plate 82 has opposite ends, each mounting plate end having a spring assembly 80. Each spring assembly 80 includes a pair of elongated members 84, 84' having an end tab 85 connecting the elongated members 84, 84' at one end. The opposite end of the elongated members 84, 84' are attached to a roll pin 87. Elongated member 84 terminates in a first end of a cylindrical coil 86 wrapped about pivot pin or roll pin 87. Elongated member 84' terminates in a central pivot rod 89 positioned axially within the cylindrical coil 86. A second end of the cylindrical coil 86 opposite the first end terminates in a stop tab 88 extending outwardly from the coil axis so that the base prevents the second coil end from rotating. When the end tabs 85 are urged away from the cup holder 90 and downward, the spring coil 86 builds up tension to allow the spring elongated members 84, 84' and end tab 85 to rotate in the opposite direction when released. The lower protrusion 94 may include an internal channel providing a conduit for liquid to flow therethrough. The internal channel provides drainage so that liquids such as rain or spilled beverages will not accumulate in the cup holder.

The springs may be rotated outwardly and downwardly from the side wall prior to inserting the locking cup holder into the deck opening and upon insertion of the cup holder into the deck opening. The springs are biased to rotate upwardly against an underside of the deck and lock the cup holder into the opening. The one or multiple armed springs attached to the body are now in the locking position up the outside walls of the beverage holder.

For ease of installation the spring assembly may sit under the lower outside shelf of the cup holder so the deck opening 18 does not have to be bigger than the cut out necessary for the cup installation.

As the beverage holder is pushed into the required installation depth, the springs return to their natural locked upward position. This may not be complete, as the springs will make contact with the underside of the installation surface wall, thus making the beverage holder secure in the installation.

Figure 23:
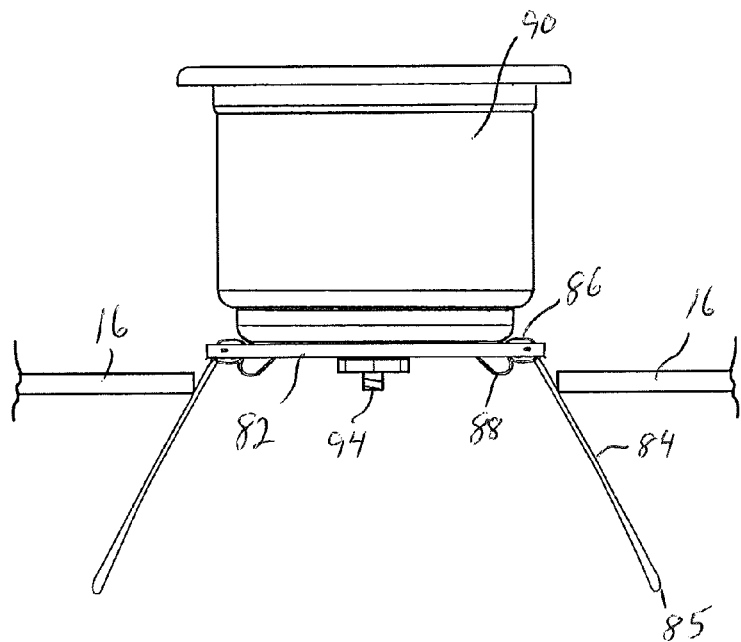
FIG. 23 is a side elevational view showing another step in the method for installing the cup holder assembly shown in FIG. 19.
Figure 24:
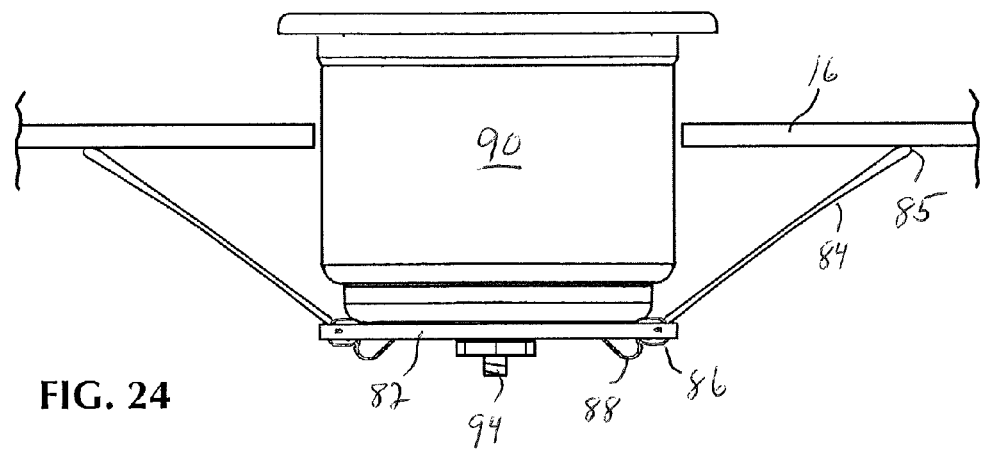
FIG. 24 is a side elevational view showing another step in the method for installing the cup holder assembly shown in FIG. 19.
Figure 25:
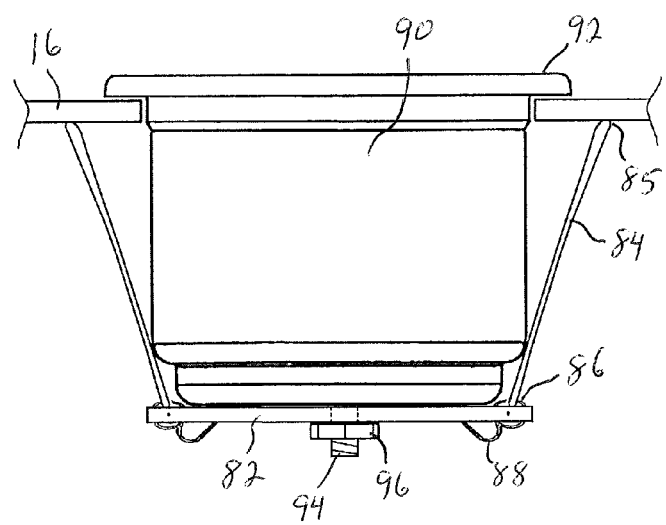
FIG. 25 is a side elevational view showing another step in the method for installing the cup holder assembly shown in FIG. 19.

In a method for installing the locking cup holder assembly 91, an installer move the cup holder 90 toward the base plate 82 as shown by arrow 105 until the lower protrusion 94 engages the base plate opening 83. The installer then rotates the fastener 96 onto the lower protrusion 94 in the direction of arrow 106 until the base plate 82 is secured to the bottom plate 94. The installer rotates the spring elongated members 84 and end tabs 85 outward from the cup holder side wall 99 and downward as shown by arrow 107 in FIG. 22. While holding the spring assemblies 80 a downward and charged position, the installer begins lowering the cup holder assembly 91 into the opening 18 of the deck 16 as shown in FIG. 23. Once the spring end tabs 86 and a portion of the elongated members 84 are below the deck surface 16, the installer releases the spring end tabs 86 and elongated members 84, allowing the spring end tabs 86 to rotate upwardly, opposite arrow 107, against the underside of the deck surface 16 and allow the tension of the spring assemblies 80 to pull the cup holder assembly 91 downward (FIG. 24) until the cup holder flange 92 is seated against the upper side of the deck surface 16 (FIG. 25). The spring assemblies 80 continue to apply force against the underside of the deck surface 16, locking the cup holder assembly 91 in the opening with the cup holder flange 92 against the upper side of the deck surface. To remove the cup holder assembly 91, the cup holder flange 92 is urged upward with sufficient force to rotate the elongated spring members 84 and end tabs 86 until the cup holder assembly 91 is fully removed from the deck opening 18.

In another embodiment of the cup holder as shown in FIGS. 26 and 27, removable locking tabs 116 may include a body portion 112 which extends through the sidewall 114 of the cup holder and may be removable from the interior of the cup holder. Flange 123 extends from the sidewall 114. A washer 118 may be used to disperse the pressure of the locking tab 116. The body portion 112 of the protrusion may be secured with a slip washer 115 and locks against the mounting ring 20 when the locking cup holder is in the installed position.

In any of the above embodiments, the cup holder assembly may include various features listed herein. A light source may be provided for illuminating at least a portion of the cup holder assembly. The cup holder assembly may be metal, plastic, composite or a combination of materials. A gasket may be provided which is disposed between the deck surface and the underside of the mounting ring or cup holder flange and may further include an adhesive on one or two sides of the gasket. The cup holder may include a drain system on the underside of the cup holder bottom plate.

The vertical wall that now extends into the installation hole is always a specific depth to match the external wall locking knobs on the cup insert to secure the installation.

The cup holder flange is wider than the mounting ring flange. The cup holder may have a sidewall having one or more steps.

When fully installed the cup holder sits flush to the deck of the installation also hiding the mounting ring.

Cup holders which have a threaded drain system may have the drain cap, drain tube or drain nut removed before engaging a fastener 96 for holding the base plate 82 onto the bottom plate 14 of the cup holder. The cap, drain tube or nut may then be threaded on over the fastener 96. This leaves a threaded or bare extension (stem), below the beverage holder. Alternately the drain cap, drain tube or drain nut may be used as the fastener for mounting the base plate 82.

The base plate 82 may alternately be fastened to the cup holder bottom plate 14 using an adhesive or non-threaded fastener.

Accordingly, the present invention accomplishes one or more of the objects described above. The cup holder for a marine vessel affixes neatly within an opening in the vessel deck and may be later removed without damaging the vessel deck or the cup holder, and will resist loosening in the deck opening during motion of the vessel.

While the present invention has been particularly described, in conjunction with a specific embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A locking cup holder for mounting in a deck surface having a deck opening comprising:
   a cup holder having a side wall and a bottom portion along a lower end of the side wall;
   a base plate having an opening securable to the lower end of a cup holder; and
   a plurality of springs attached to the base plate to allow rotation of the springs about the base plate;
   whereby the springs are rotated outwardly from the side wall prior to inserting the locking cup holder into the deck opening and upon insertion of the cup holder into the deck opening, the springs rotate against an underside of the deck and lock the cup holder into the opening.

2. The cup holder of claim 1 including a protrusion extending downwardly from the bottom portion of the cup holder and an opening in the base plate wherein the protrusion is engagable with the base plate opening.

3. The cup holder of claim 2 wherein the protrusion includes threads and the base plate is secured to the bottom plate by engaging the opening with the protrusion and securing a threaded fastener to the threaded protrusion.

4. The cup holder of claim 2 wherein the protrusion includes a channel extending therethrough.

5. The cup holder of claim 1 wherein the springs are biased to rotate upwardly toward the side walls of the cup holder.

6. The cup holder of claim 1 wherein the springs are elongated and include a first end rotatably connected to a pivot pin secured to the base plate and a distal end which rotates in an arc about the pivot pin.

7. The cup holder of claim 6 wherein the spring first end is a coil wrapped about the pivot pin and secured at a coil first end to the base plate for providing the rotational tension of the spring.

8. A method of mounting and locking a cup holder in a deck surface having a deck opening comprising:
   providing a cup holder having a side wall and a bottom portion along a lower end of the side wall, a base plate having an opening securable to the lower end of a cup holder, and a plurality of springs attached to the base plate to allow rotation of the springs about the base plate;
   rotating the springs outwardly from the side wall;
   inserting the cup holder into the deck opening and rotating the springs against an underside of the deck and locking the cup holder into the opening.

9. A locking cup holder for mounting in a deck surface having a deck opening comprising:
   a mounting ring having a vertical lip for extending within the deck opening and a horizontal lip extending outward from the vertical lip over the deck surface about the deck opening;
   a plurality of grooves in the horizontal lip of the mounting ring;
   a plurality of clips, each clip having a first horizontal portion engagable in the horizontal lip groove and a second horizontal portion below the first horizontal portion; and
   a cup holder securable within the mounting ring;
   wherein the clips secure the mounting ring to the deck surface about the deck opening when the clip first horizontal portion engages one of the grooves in the horizontal lip and the clip second horizontal portion engages the deck surface about the deck opening.

10. The locking cup holder of claim 9 including a plurality of grooves in the vertical lip engagable with the clip bottom portion.

11. The locking cup holder of claim 9 including a plurality of protrusions extending outwardly from the side wall.

12. The locking cup holder of claim 9 wherein the cup holder includes a horizontal lip engagable with the mounting ring horizontal lip.

13. The locking cup holder of claim 9 wherein each clip has a vertical portion extending downward from the first horizontal portion and the second horizontal portion extends outwardly from a lower end of the vertical portion.

14. The locking cup holder of claim 9 wherein the clip second horizontal portion engages a lower side of the deck surface.

15. The locking cup holder of claim 9 wherein the clip is locked into a securing position when the cup holder assembly is in an inserted position.

16. A method of mounting a cup holder in a deck surface having a deck opening comprising:
   providing a mounting ring having a vertical lip for extending within the deck opening and a horizontal lip extending outward from the vertical lip over the deck surface about the deck opening, the mounting ring having a plurality of grooves in the horizontal lip;
   providing a plurality of clips, each clip having a first horizontal portion engageable in the horizontal lip groove and a second horizontal portion below the first horizontal portion;
   providing a cup holder securable within the mounting ring;
   placing the mounting ring in the deck opening with the vertical lip extending within the deck opening and the horizontal lip extending outward from the vertical lip over the deck surface about the deck opening;
   placing the clips in the mounting ring grooves such that the clip first horizontal portion engages one of the grooves in the horizontal lip and the clip second horizontal portion engages the deck surface about the deck opening to secure the mounting ring to the deck surface; and
   placing and securing the cup holder within the mounting ring.

17. A locking cup holder for mounting in a deck surface having a deck opening comprising:
   a mounting ring having a vertical lip with a lower edge for extending within the deck opening and a horizontal lip securable to the deck surface over the deck opening;
   a cup holder having a wall, a bottom portion, a rim extending outwardly from an upper portion of the wall and a plurality of protrusions extending outwardly from the cylindrical wall below the rim, the cup holder protrusions being spaced from the cup holder rim a distance of at least the height of the mounting ring vertical lip, the protrusions engagable with the vertical lip when the cup holder is pushed fully into the mounting ring.

18. The locking cup holder of claim 17 wherein a locking tab extends through the sidewall of the cup holder and is removable from the interior of the cup holder.

19. The locking cup holder of claim 17 wherein the protrusions are engageable with the lower edge of the vertical lip when the cup holder is pushed fully into the mounting ring.

20. A method of mounting a locking cup holder in a deck surface having a deck opening comprising:
- providing a mounting ring having a vertical lip with a lower edge for extending within the deck opening and a horizontal lip securable to the deck surface over the deck opening;
- providing a cup holder having a wall, a bottom portion, a rim extending outwardly from an upper portion of the wall and a plurality of protrusions extending outwardly from the cylindrical wall below the rim, the cup holder protrusions being spaced from the cup holder rim a distance of at least the height of the mounting ring vertical lip;
- placing the cup holder within the mounting ring; and
- securing the cup holder in the mounting ring by engaging the protrusions with the vertical lip when the cup holder is pushed fully into the mounting ring.

* * * * *